(12) United States Patent
Nichols

(10) Patent No.: US 7,367,571 B1
(45) Date of Patent: May 6, 2008

(54) TOOL AND TASK BOX STORAGE, TRANSPORT, AND WORKBENCH SYSTEM

(75) Inventor: Gregory Alan Nichols, Woodside, CA (US)

(73) Assignee: Stainbrook & Stainbrook, LLP, Santa Rosa, CA (US)

( * ) Notice: Subject to any disclaimer, the term of this patent is extended or adjusted under 35 U.S.C. 154(b) by 198 days.

(21) Appl. No.: 11/123,619

(22) Filed: May 6, 2005

Related U.S. Application Data

(60) Provisional application No. 60/569,169, filed on May 7, 2004.

(51) Int. Cl.
*B62B 1/00* (2006.01)
(52) U.S. Cl. .............................. 280/47.18; 280/47.17; 280/47.34; 280/47.131; 280/47.19
(58) Field of Classification Search ............ 280/47.18, 280/47.19, 47.35, 47.371; 312/334.17
See application file for complete search history.

(56) References Cited

U.S. PATENT DOCUMENTS

| | | | | |
|---|---|---|---|---|
| 5,702,115 A | * | 12/1997 | Pool | 280/47.35 |
| 5,906,381 A | * | 5/1999 | Hovatter | 280/47.18 |
| 6,702,608 B2 | * | 3/2004 | Brennan, Jr. | 439/501 |
| 7,044,569 B1 | * | 5/2006 | Relyea et al. | 312/249.11 |

* cited by examiner

*Primary Examiner*—Christopher P. Ellis
*Assistant Examiner*—Katy Meyer
(74) *Attorney, Agent, or Firm*—Craig M. Stainbrook; Stainbrook & Stainbrook, LLP

(57) ABSTRACT

A machine tool stand and/or workbench, electrical outlet panel, light supply, and modular task box system, combined into an integrated system that includes a support structure having a support base on wheels and side rails disposed on the surface of the support base. The side rails include structure for attaching tool holders, work pieces holders, work surfaces, and the like.

14 Claims, 24 Drawing Sheets

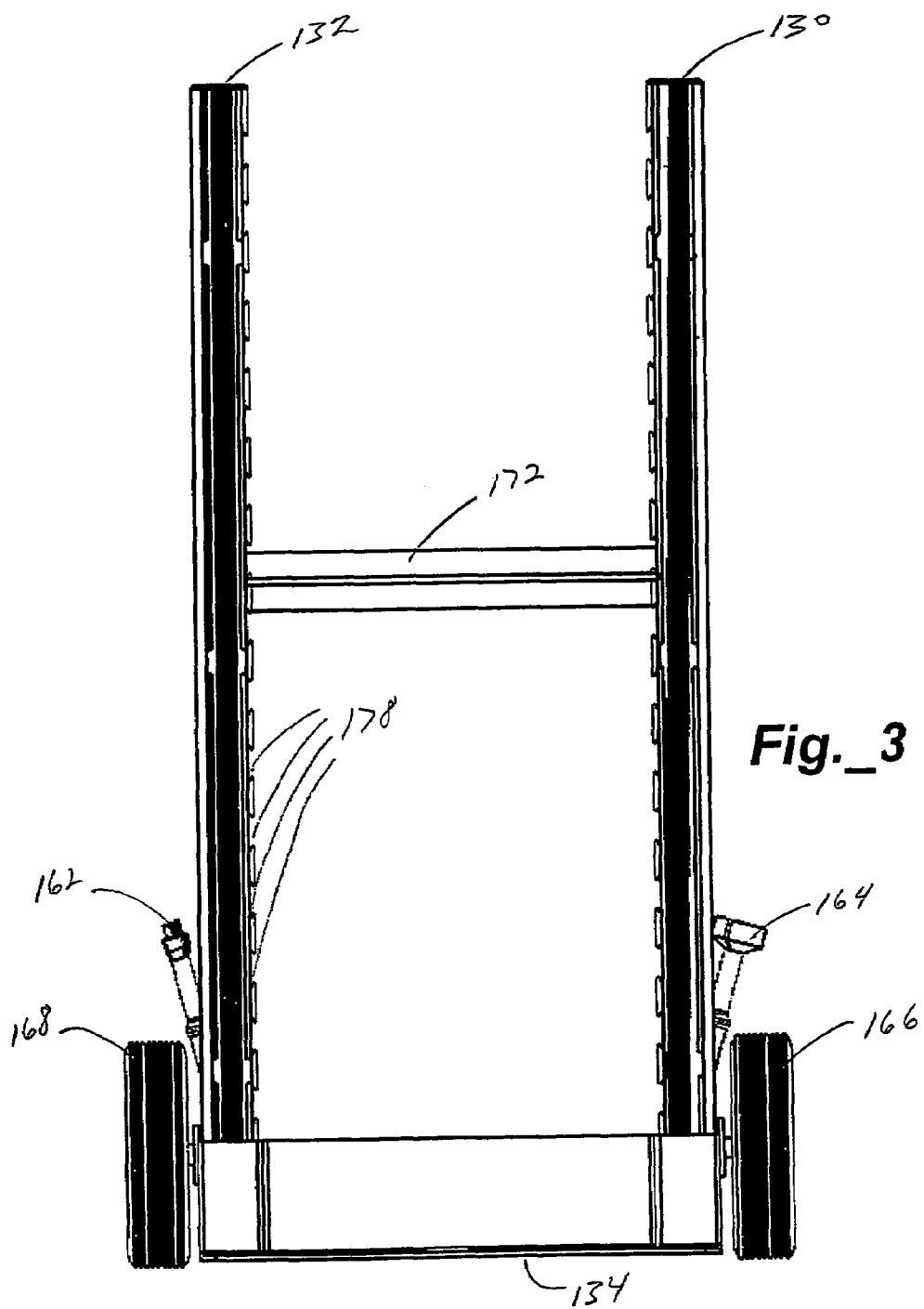
Fig. _3

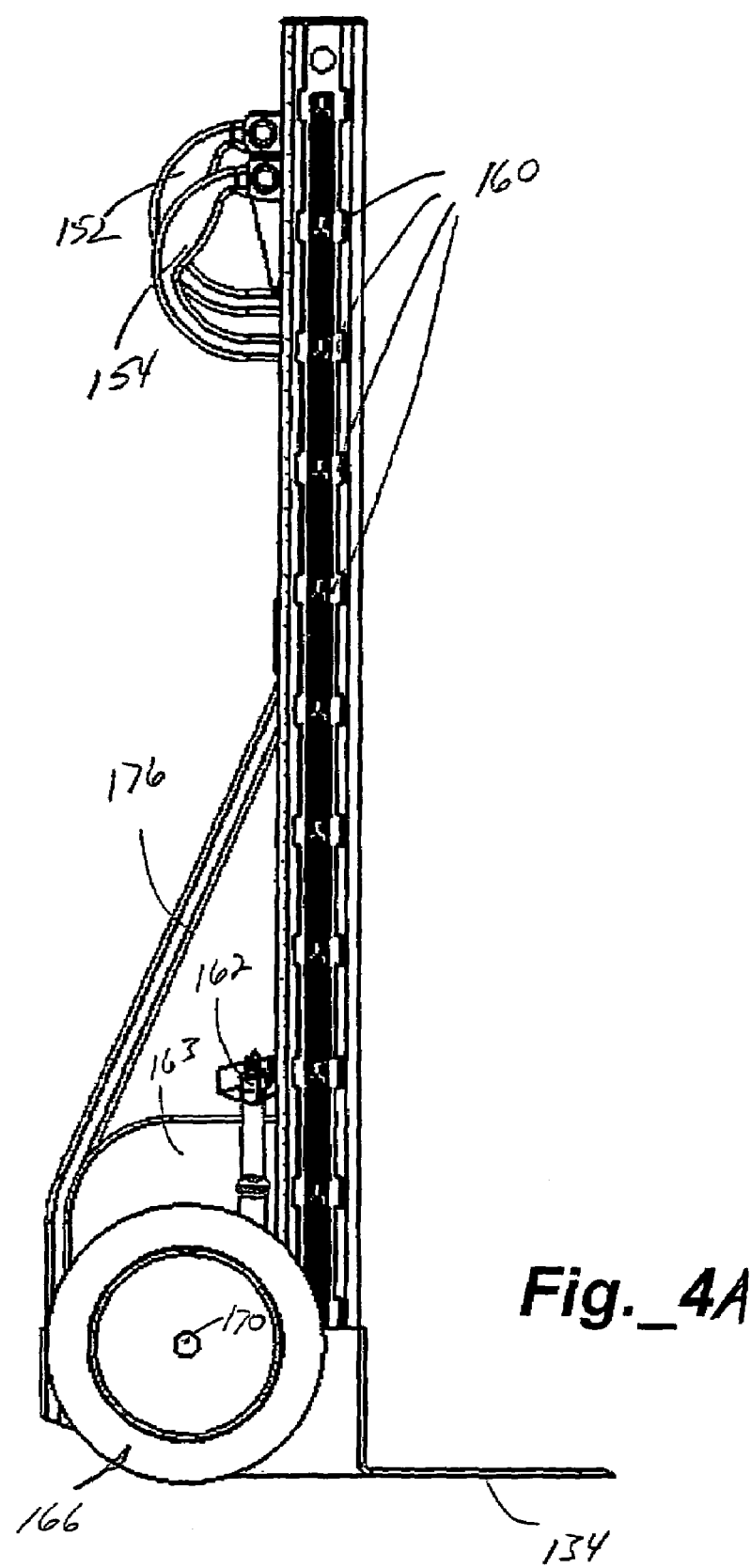
Fig._4A

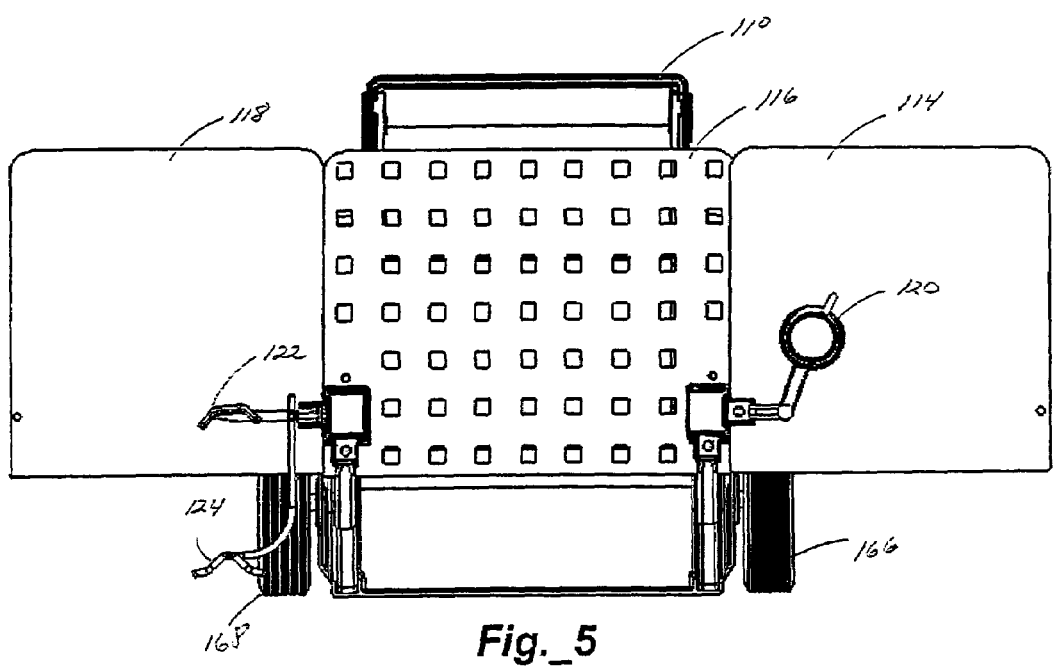
Fig._5

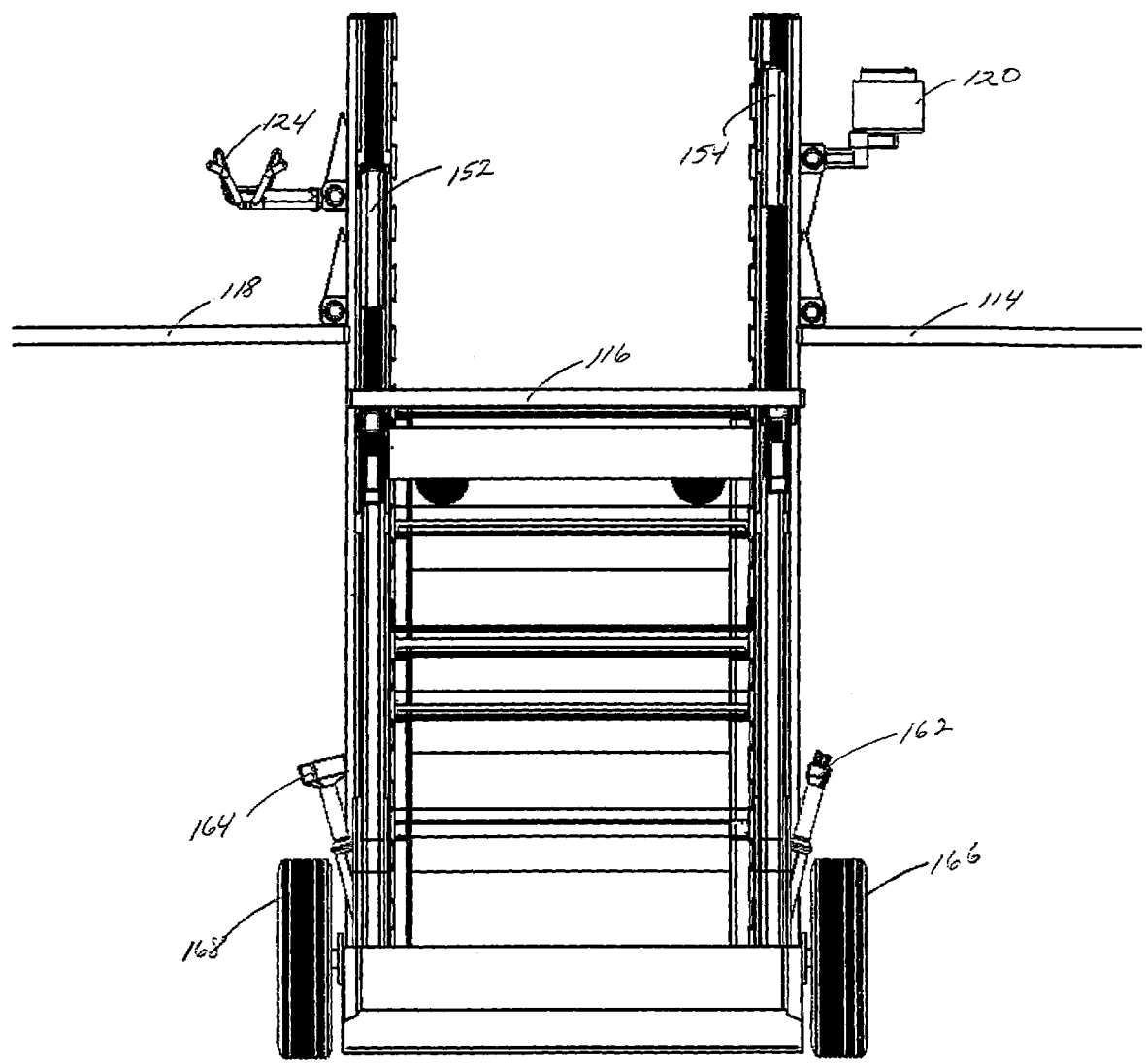
Fig._6

Fig._8

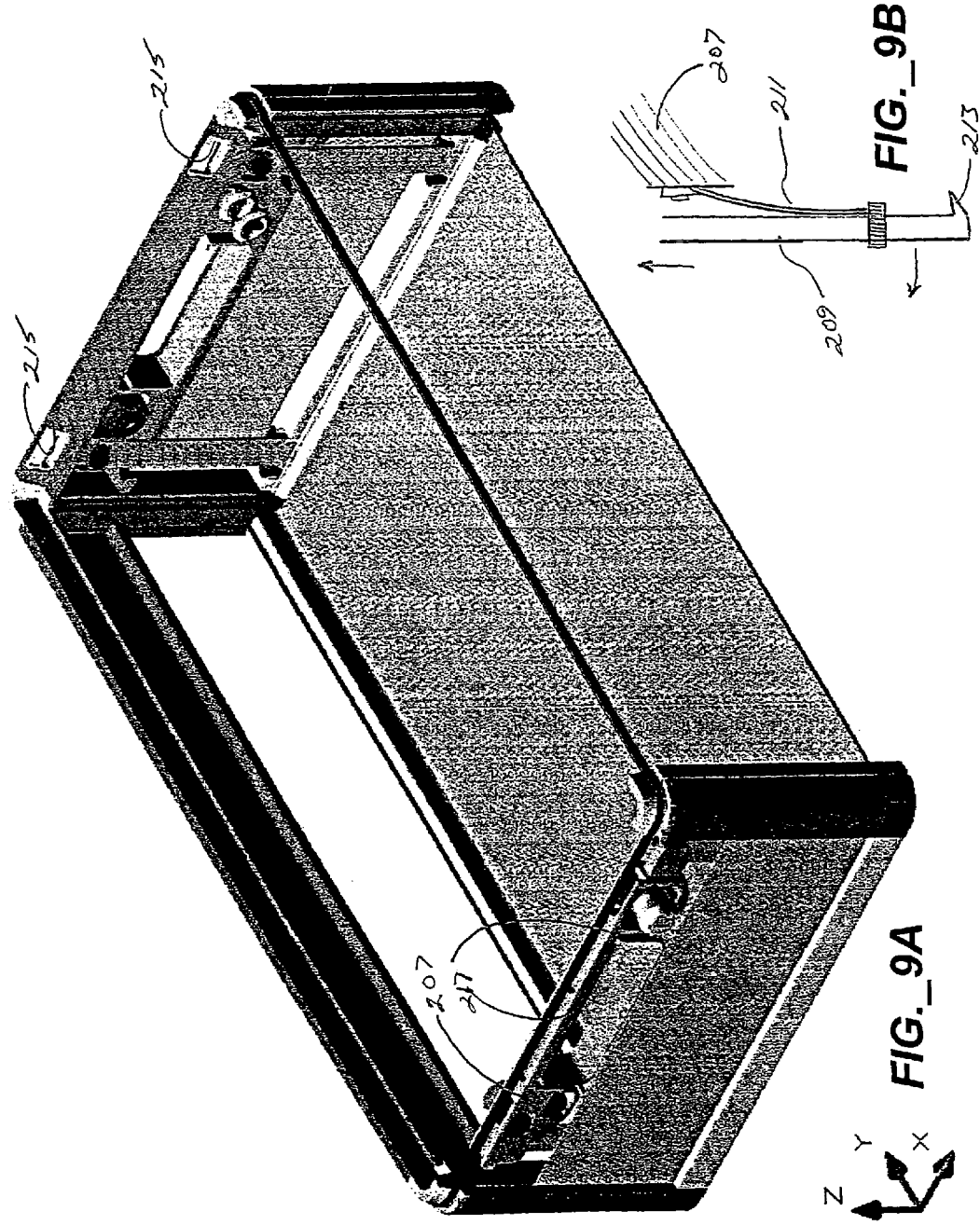

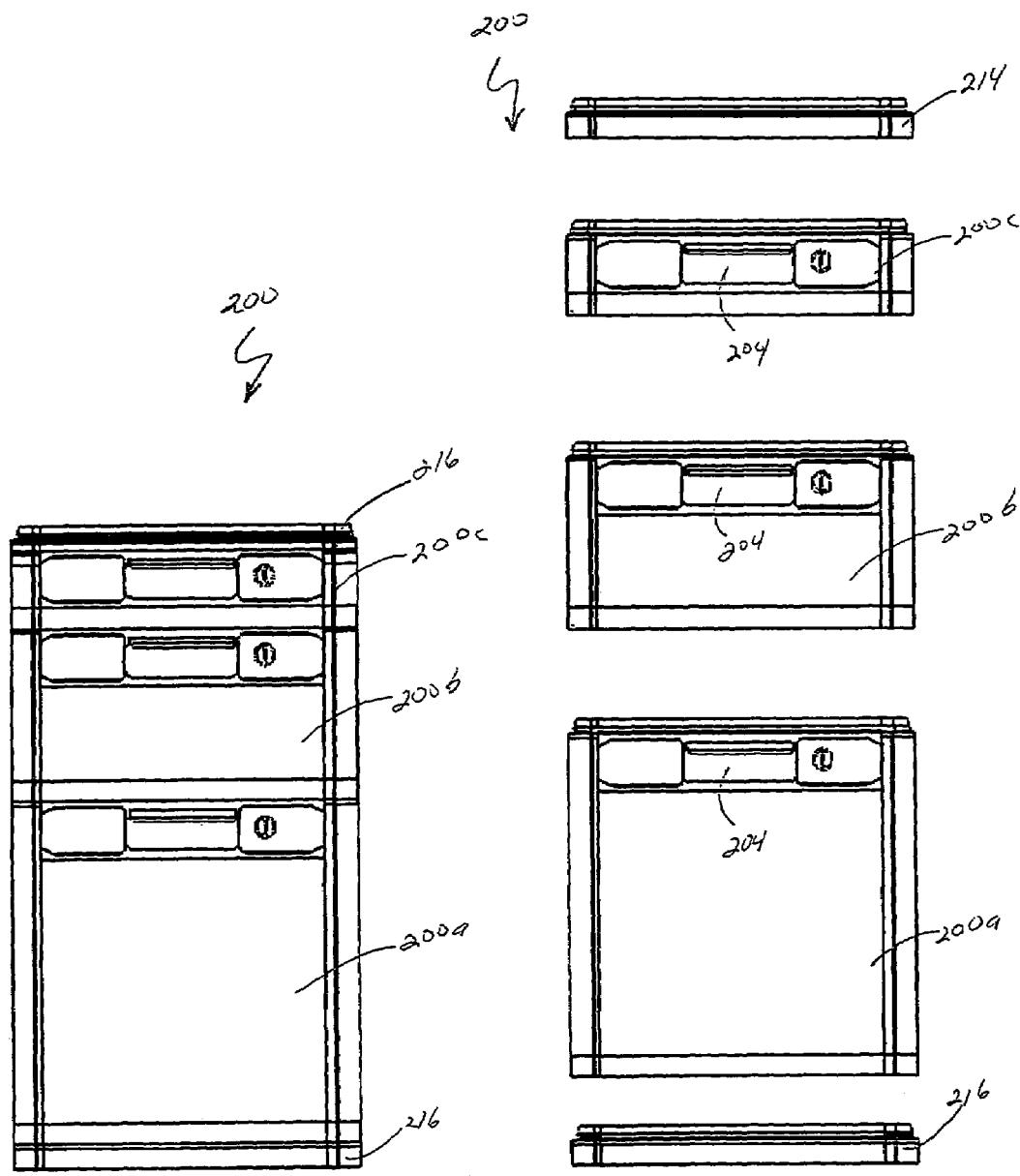
FIG._10a   FIG._10b

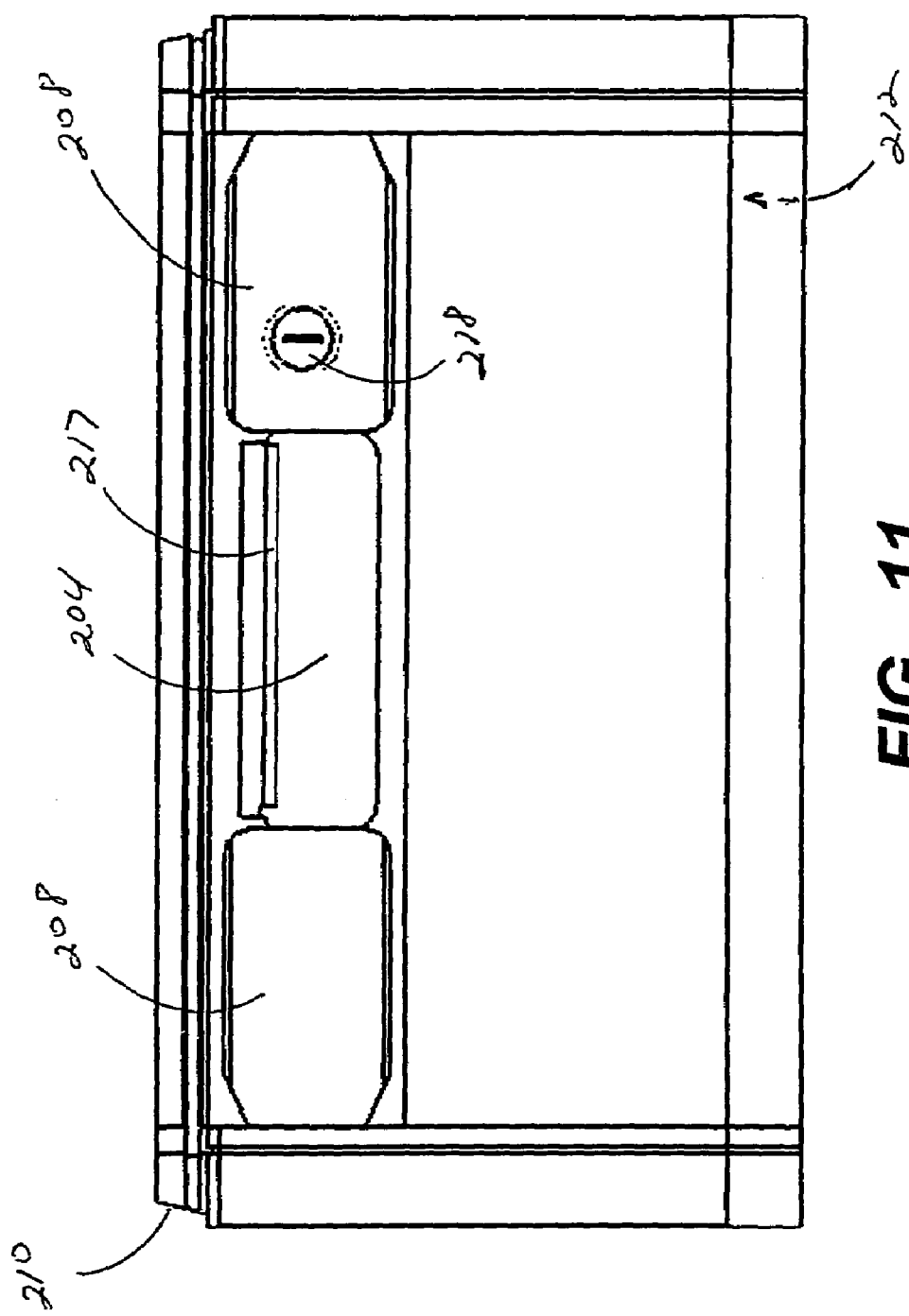
FIG._11

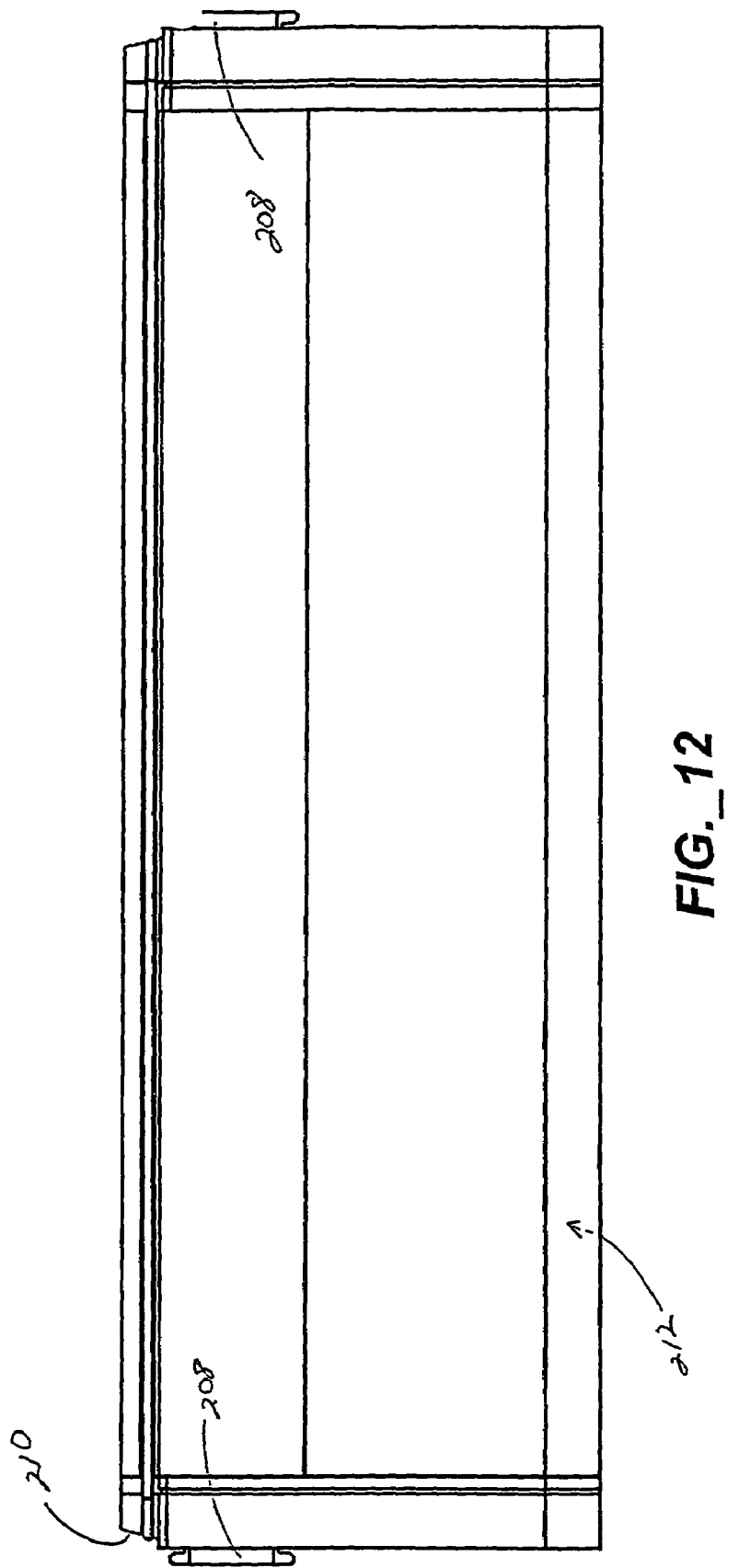
FIG._12

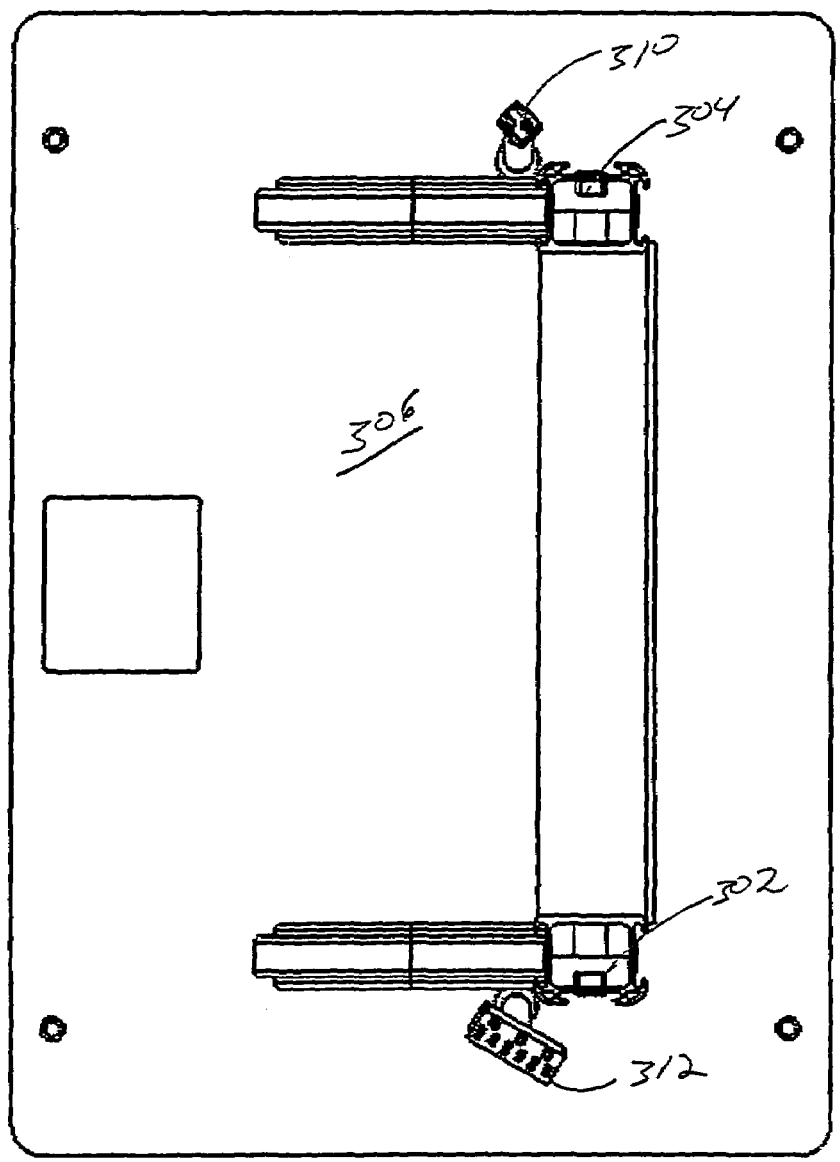
FIG._14

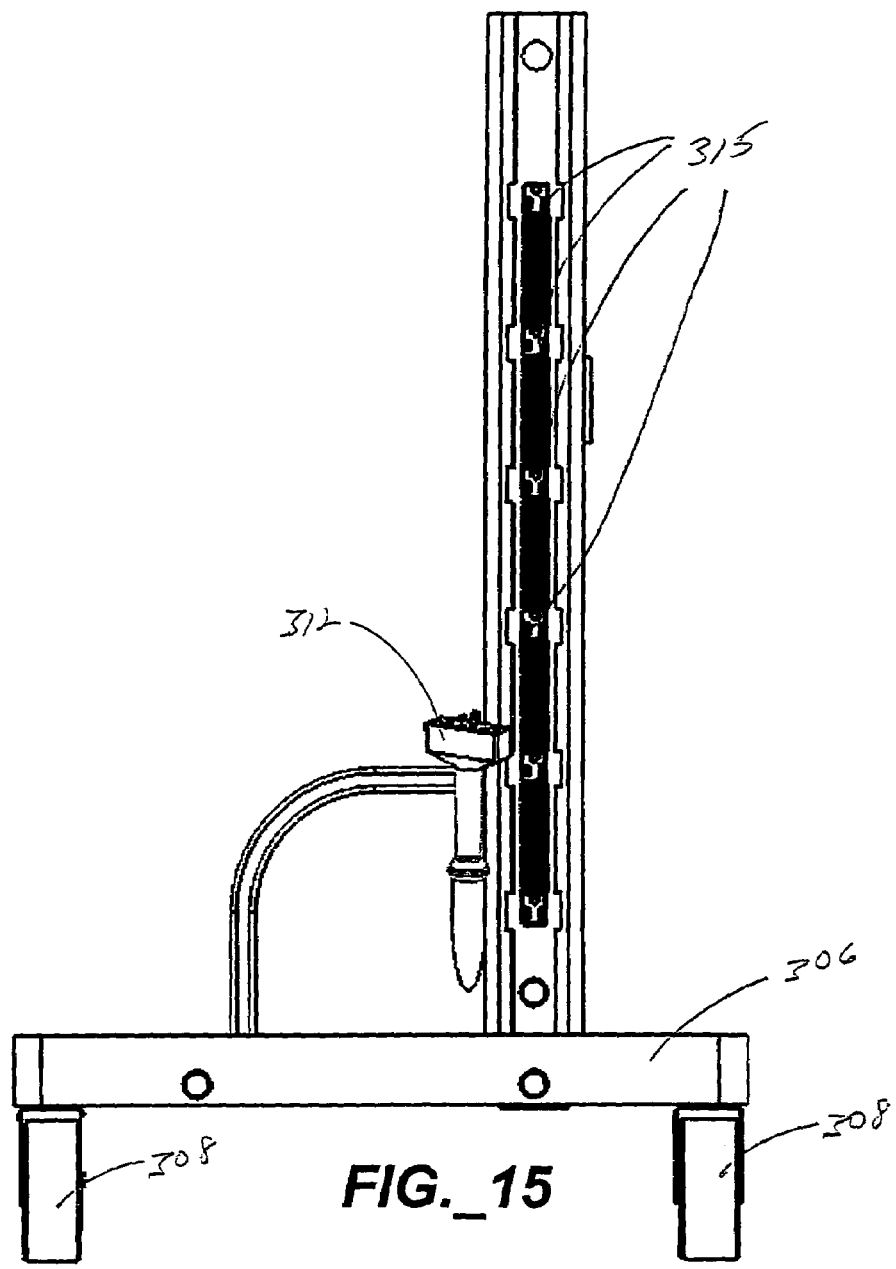
FIG._15

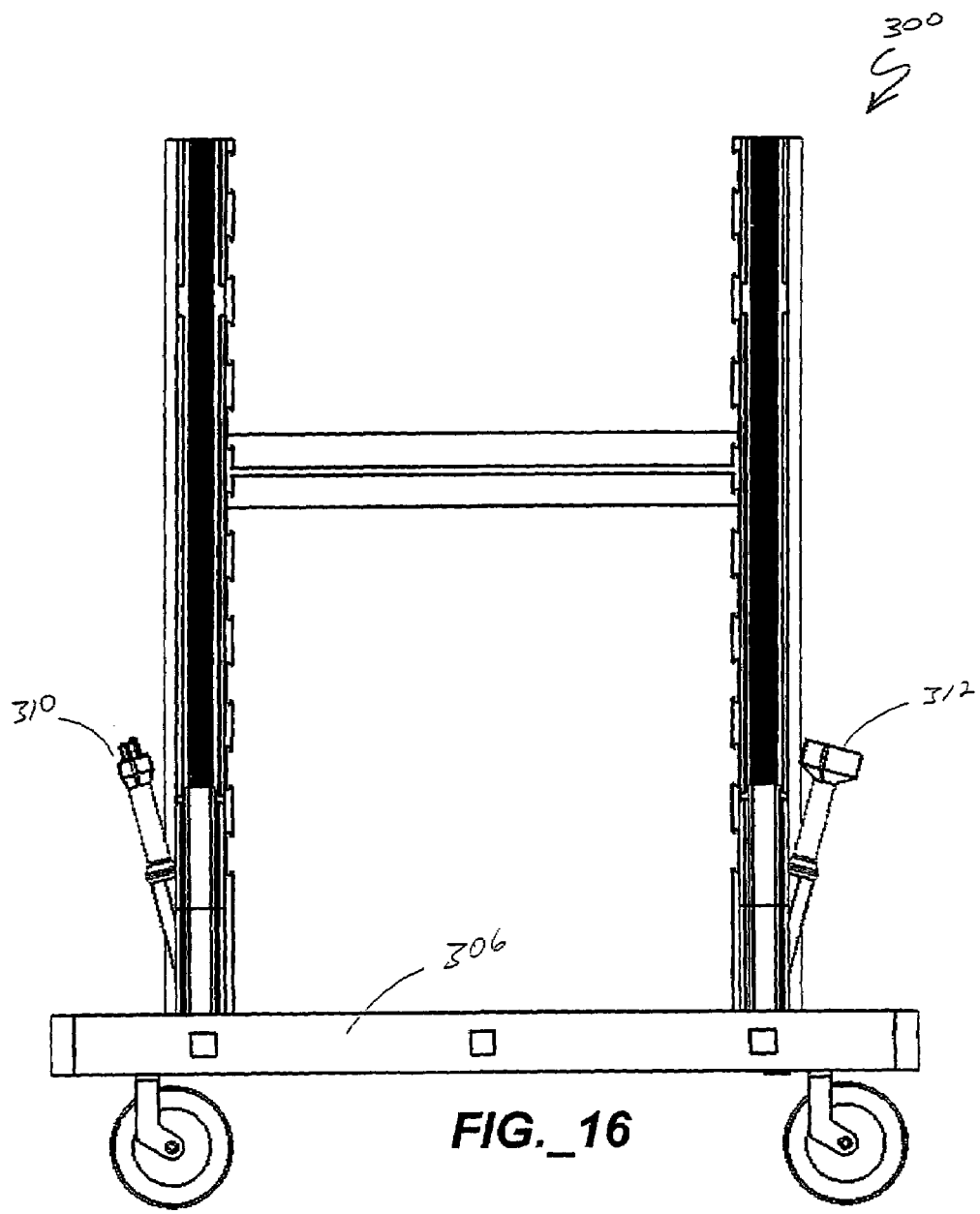
FIG._16

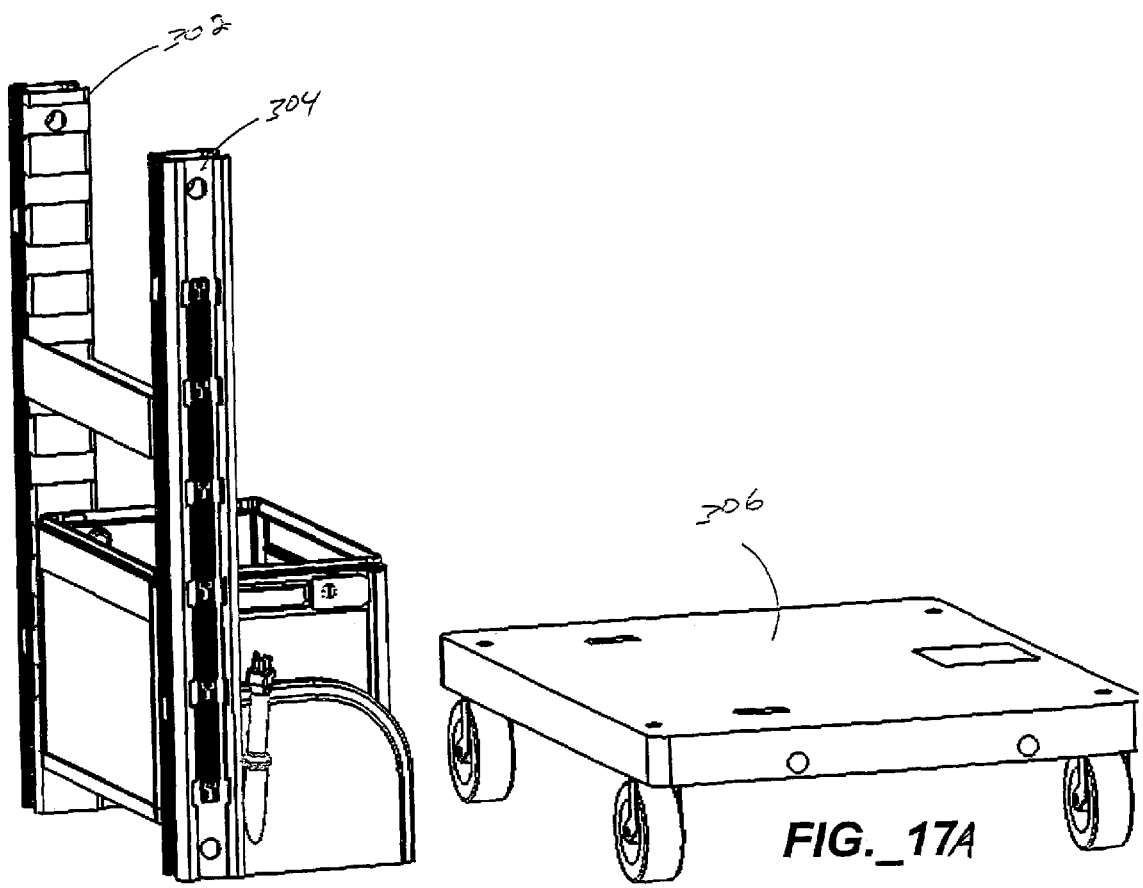
FIG._17A

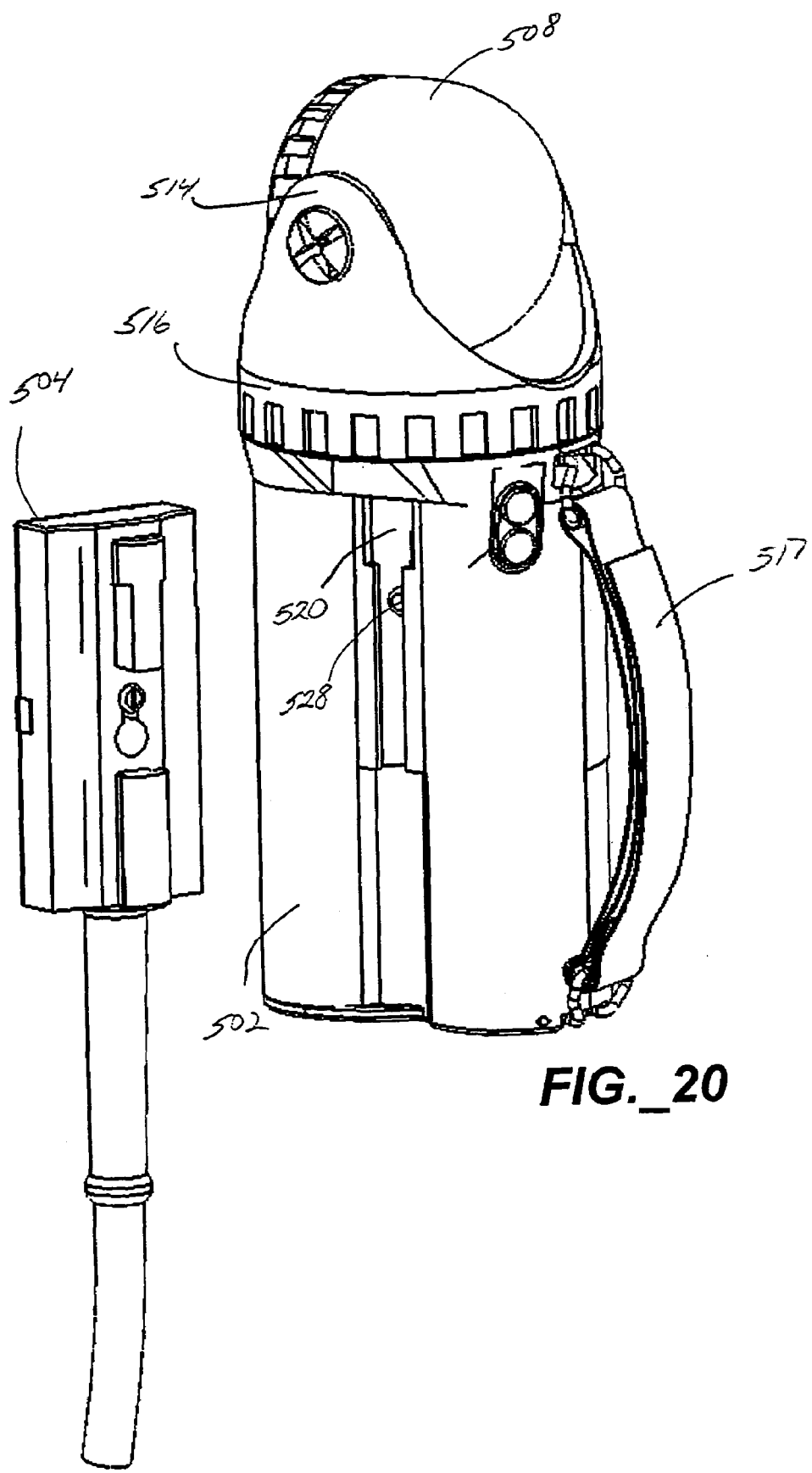
FIG._20

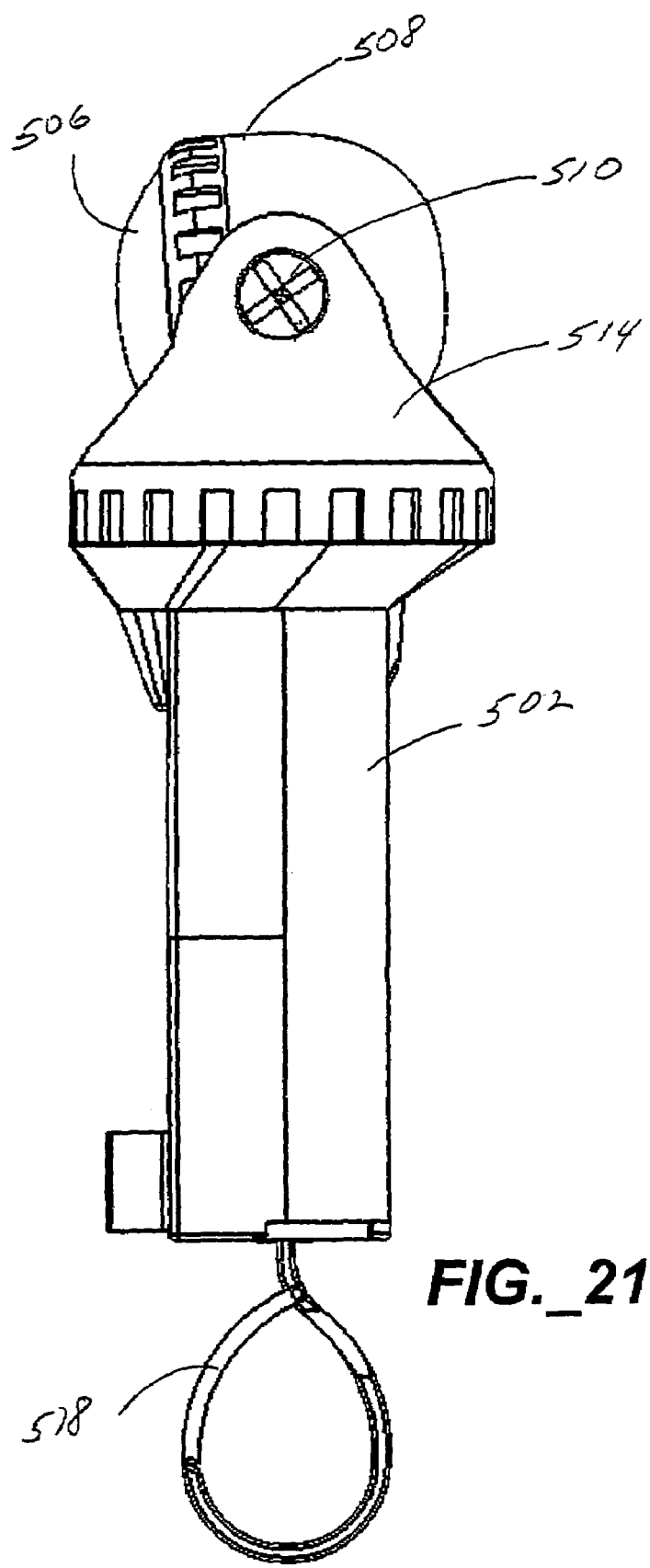
FIG._21

TOOL AND TASK BOX STORAGE, TRANSPORT, AND WORKBENCH SYSTEM

CROSS REFERENCE TO RELATED APPLICATIONS

The present application claims the benefit of the filing date of U.S. Provisional/Utility Patent Application Ser. No. 60/569,169, filed May 7, 2004 (May 7, 2004).

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to work tool and material transporting and workbench devices, and more particularly to a combination tool and material task box storage, transport, and workbench system.

BACKGROUND INFORMATION AND DISCUSSION OF RELATED ART

Whether working in the field or in a shop, craftsmen, tradesmen, woodworkers, mechanics, residential handymen, and the like are generally interested in minimizing the inconvenience and time involved in taking tools from storage containers, transporting the tools, setting them up at the work site, finding and connecting to electrical power, setting up a suitable work surface for holding and supporting workpieces, and then taking down the work site and returning the tools to storage when finished. Unfortunately, carrying larger tools, work materials, and multiple small power and hand tools to remote work sites can be an ungainly exercise requiring numerous small trips to and from vehicles and shops. Further, it can take considerable effort to organize and contain material and tools for transport to protect them from damage and to provide for easy access once in the field. Once in the field and at the site, deploying and using connections to power can be a frustrating adventure of untangling cords and hunting for elusive receptacles or extension cord ends. Further, but without nearly exhausting the annoyances of interest, it is a challenge to get adequate light onto a remote work site.

Accordingly, it would be desirable to have a system for conveniently storing and transporting tools and work materials and for providing electrical power in the field. To that end, several solutions have been proposed, including that described in U.S. Pat. No. 6,345,829 B1, to Mueller. This patent discloses a hand-truck-type convertible apparatus for transporting and supporting a work tool at a work site. The apparatus has an extended and a collapsed position, and a vertical work configuration and a horizontal transport configuration. It includes a support frame extending along a longitudinal axis between a first end and a second end. A base member extends from the support frame in a direction perpendicular to the longitudinal axis of the support frame and stabilizes the support frame in its vertical, working position. A primary wheel assembly is mounted to the support frame opposite the base member such that the primary wheel assembly and the base member stabilize the support frame in its vertical, working position. A work platform is mounted to the second end of the support frame and is movable between an extended position and a collapsed position. The work platform is supported in its extended position by a pair of brace members that extend from opposite sides of the work platform. The brace members are each received within a locking device to secure the work platform in an extended position. The locking devices can be released to allow the work platform to move from the extended position to the collapsed position. The apparatus further includes an electrical outlet box mounted on its rear surface, offering the user multiple individual outlets; it is connected to a power source through a cord.

U.S. Pat. No. 5,957,472 to Borganti, teaches a combined hand truck and machine stand, wherein one configuration can readily be converted into the other. The device includes a first frame support pivotally coupled to a second frame support for movement between a first position forming a hand truck and a second position forming a machine stand. A machine support is pivotally coupled to the first frame support and is movable between a first position forming the hand truck and a second position forming the machine stand. A base plate is pivotally coupled to a lower portion of the first frame support, and is movable between a first position pivoted outwardly relative to the first frame support and locked in place to prevent the apparatus from toppling when in the form of a hand truck, and a second position pivoted inwardly relative to the first frame support when the apparatus is in the form of a machine stand. The second frame support includes a pair of legs and a cross-piece support extending between and coupled for rotation to each leg. A plate defining a flat surface for engaging the machine support is fixed to the cross-piece support, and a handle is coupled to, and extends outwardly from the plate. When the apparatus is in the form of a hand truck, the plate engages the machine support to thereby prevent rotation of the cross-piece support and allow the handle to be used to move the hand truck. When the apparatus is configured as a machine stand, the cross-piece support forms a buttress for contacting and supporting the machine support.

U.S. Pat. No. 5,529,322 to Barton, shows a combination transport device and work surface has a collapsible support member and base member. In the collapsed position, the support member and base member are close to a stem of the device to define a transport surface. The transport surface can be easily moved via a handle and wheels. In the extended position, the support member and the base member extend transversely from the stem to define a work surface and a support base respectively.

U.S. Pat. No. 5,224,531 to Blohm, discloses a portable apparatus for storing tools in an organized fashion and which also converts to a combination saw table, router table and workbench. The apparatus can be readily maneuvered, loaded into a truck bed and stored when folded. It also provides a rigid work surface with easy tool access when in the set-up position.

At present in the market place, Ryobi Technologies, Inc., offers a portable toolbox on wheels having sliding drawers for holding it's 18.0V Six Pack, which includes a drill/driver, compound miter saw, circular saw, reciprocating saw, Speed Saw™, and flashlight, along with three rechargeable battery packs and a one-hour diagnostic charger. The tool box on wheels doubles as a miter saw work stand.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

Accordingly, the tool and task box storage, transport, and workbench system of the present invention provides a combination hand truck, machine tool support stand or workbench, electrical outlet panel, light supply, modular task box system, and support structure, all of which are gracefully combined into an integrated system that includes an optional winch system for facilitating easy lifting of the apparatus into a pick-up truck or other vehicle.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty that characterize the invention are pointed out with particularity in the claims annexed to and forming part of this disclosure. The invention does not reside in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 3 is a rear view in elevation of the hand truck;

FIG. 4A is a side view in elevation of the hand truck;

FIG. 5 is a top view of the hand truck shown in FIG. 1;

FIG. 6 is a rear view in elevation of the apparatus of FIGS. 1 and 5;

FIGS. 9A and 9B are, respectively, a perspective view of the task box shown with side panels and handle covers removed, and a side view in elevation showing detail of the latching system of the task box;

FIG. 10a is a side view in elevation showing an integrated plurality of stackable task box units of varying sizes in a stacked configuration;

FIG. 10b is a side view in elevation showing the stackable task boxes of FIG. 10a separated into discrete boxes;

FIG. 11 is a side view in elevation of a task box, showing detail of the locking assembly;

FIG. 12 is a front view in elevation of a task box unit;

FIG. 14 is a top view of the task cart of FIG. 13;

FIG. 15 is a side view in elevation thereof;

FIG. 16 is a front view in elevation thereof;

FIG. 17A is a perspective view of the task cart showing the side rails removed from the dolly and including a task box installed between the side rails;

FIG. 20 is a front perspective view thereof, showing the task light with the charger/extension cord removed; and FIG. 21 is a side view in elevation thereof.

DETAILED DESCRIPTION OF THE INVENTION

Figure 1:
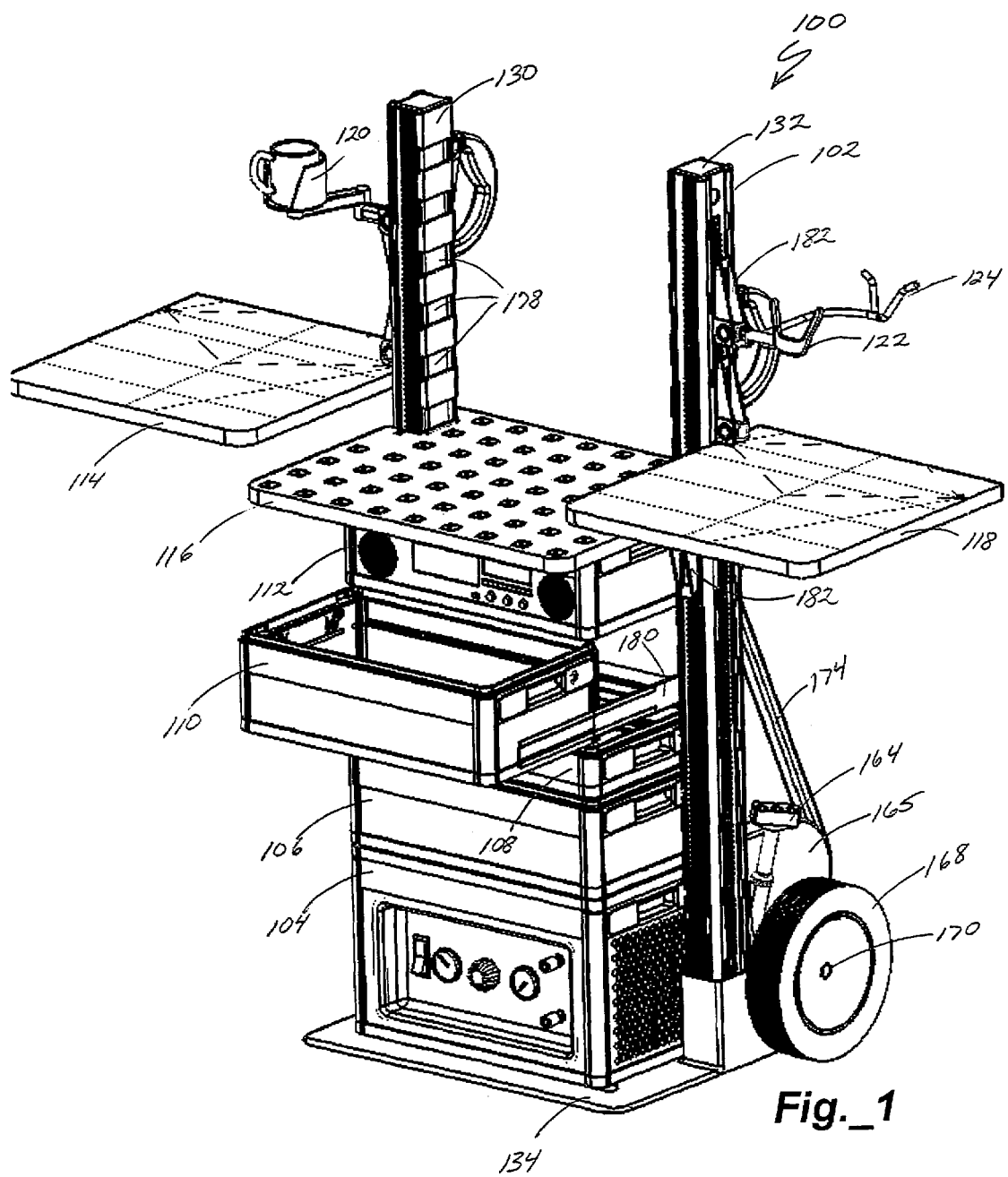
FIG. 1 is a perspective view of the tool and task box storage, transport, and workbench system of the present invention, showing the inventive apparatus in a working configuration with its hand truck, task box, and workbench components utilized, and having several optional components deployed.

Referring to FIGS. 1 through 21, wherein like reference numerals refer to like components in the various views, there is illustrated therein a new and improved tool and task box storage, transport, and workbench system, generally denominated 100 herein. In its essential form, the system comprises some kind of generally planer support base on wheels, preferably the base of either a hand truck or a dolly, and at least two side rails vertically disposed from the top surface of the support base. The side rails include structure adapted to support a number of selectively attachable tool holders, work surfaces, electrical devices, and lockable, nestable tool storage task boxes. The support base and rails also include retractable power cords, and an array of electrical receptacles extends along one or more sides of the side rails so that tools can be powered in the immediate proximity of the base and rails.

In combination, the support base and side rails provide a powerful and compact apparatus for storing, transporting, displaying, and powering tools and equipment employed in the construction, manufacturing, and service and repair trades.

Figure 2:
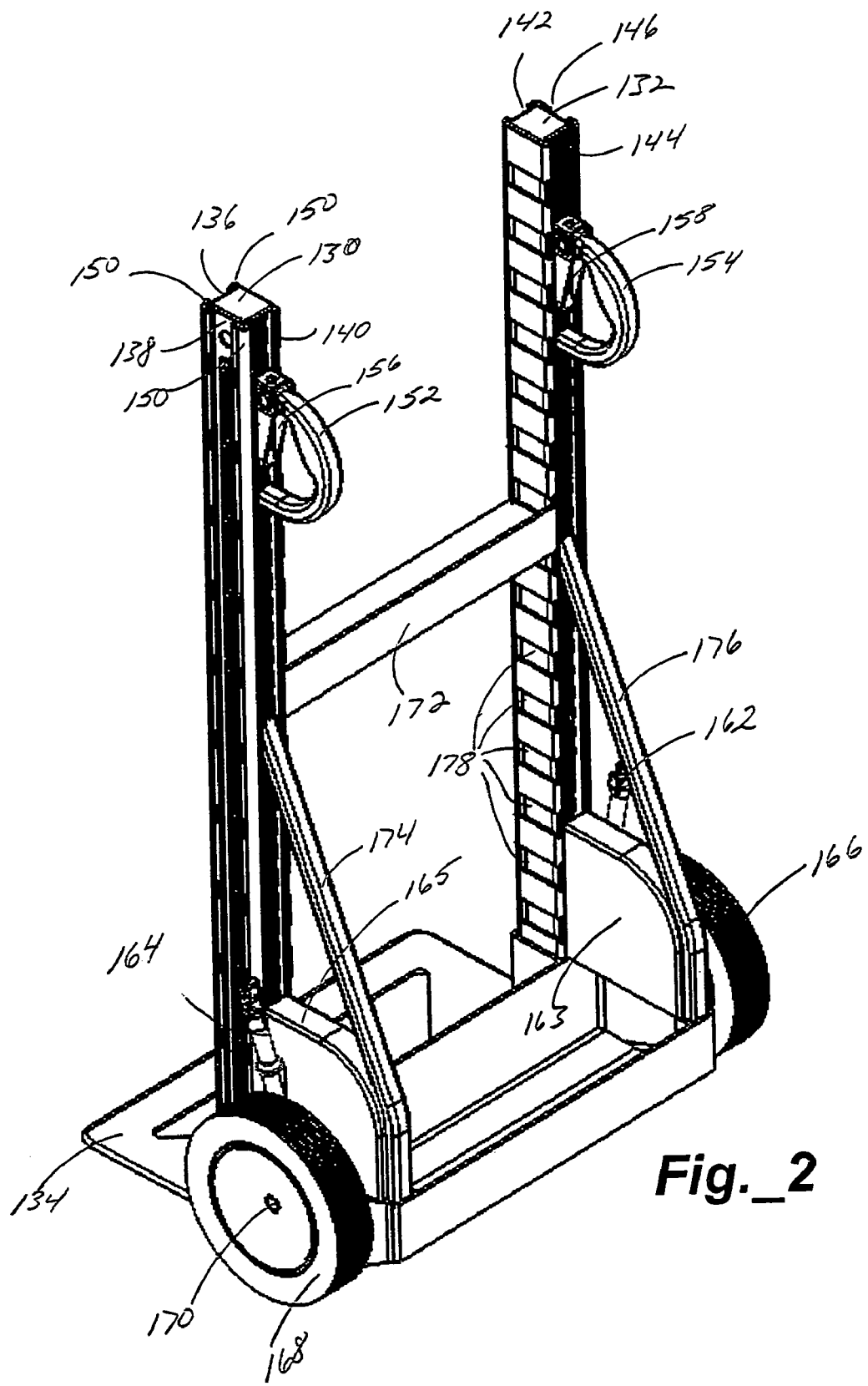
FIG. 2 is an upper rear perspective view of the hand truck of the present invention.
Figure 4B:
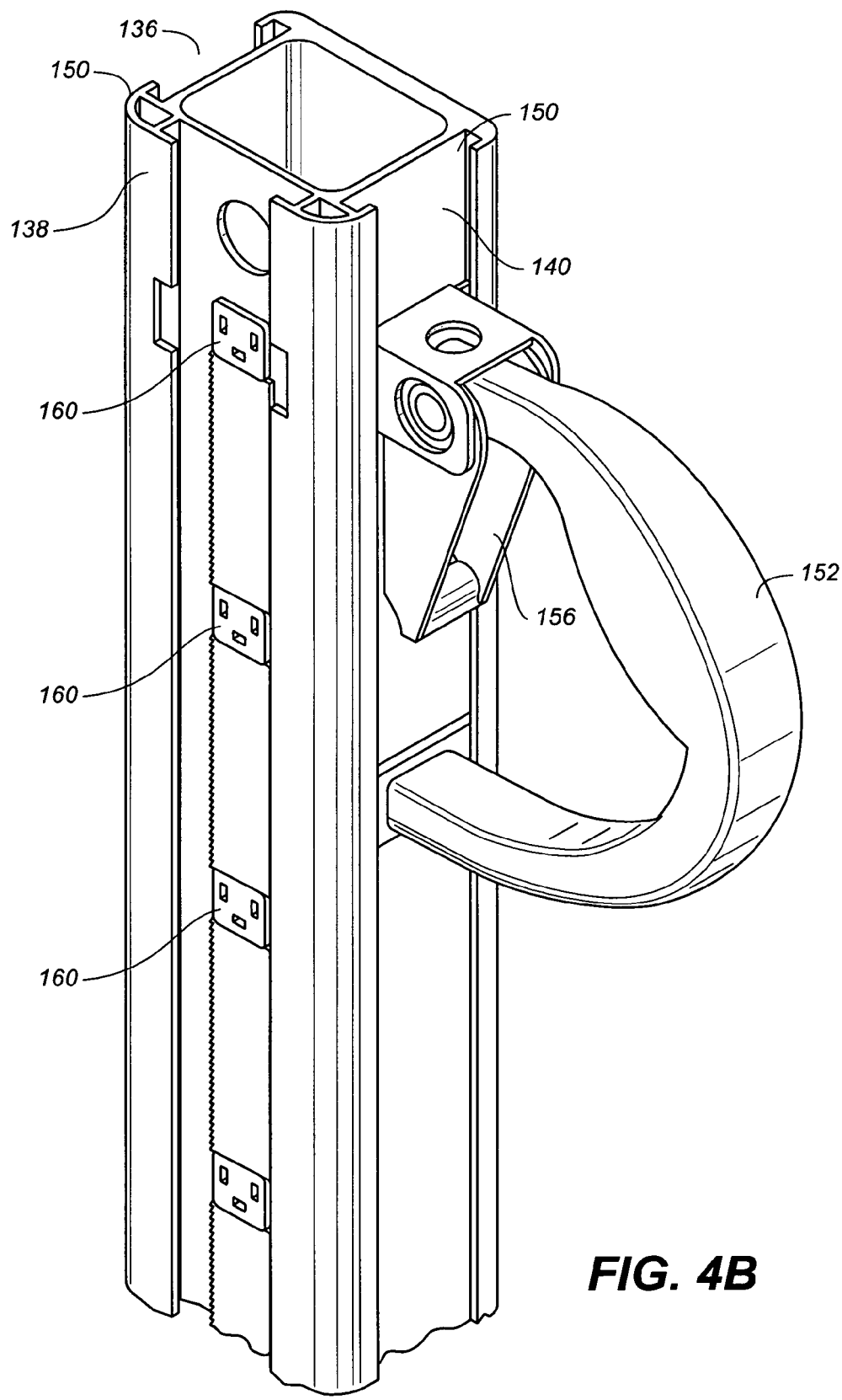
FIG. 4B is a detailed perspective view showing the upper portion of a side rail of the hand truck.
Figure 7:
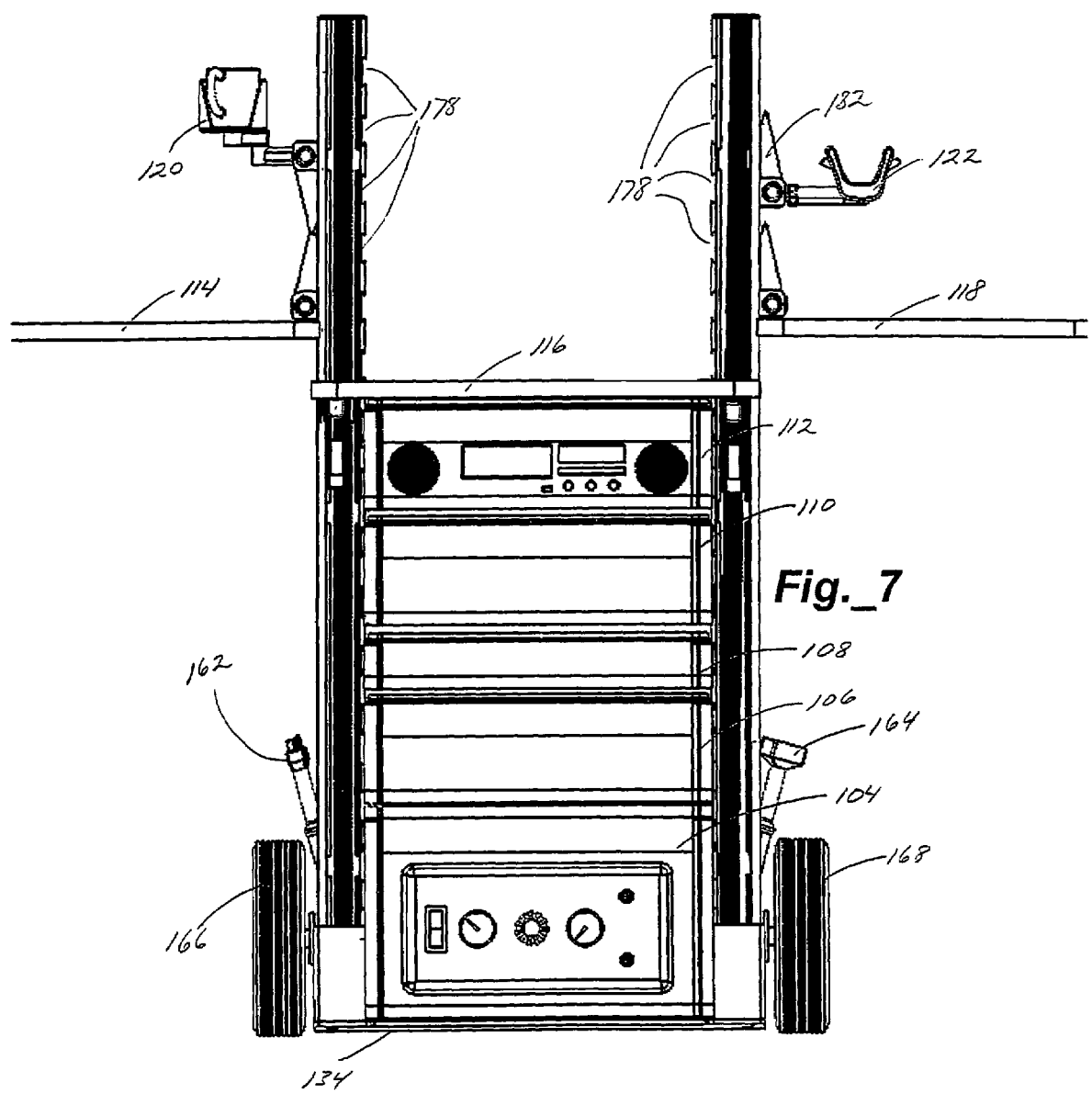
FIG. 7 is a front view in elevation thereof.
Figure 8:
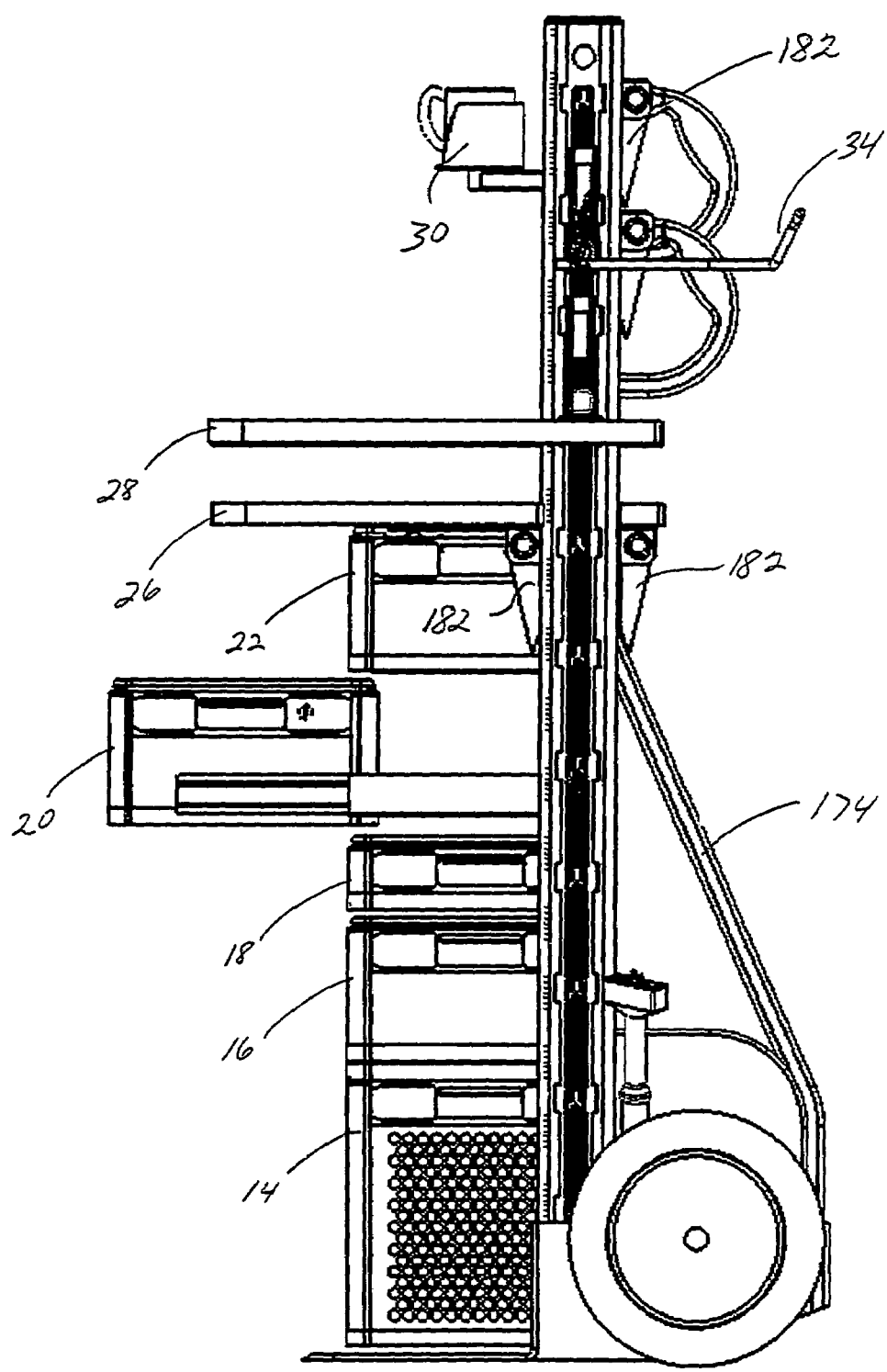
FIG. 8 is a side view in elevation thereof.

FIG. 1 is a perspective view showing selected primary elements of the inventive systems in a working configuration, said elements including: task hand truck 102; first through fifth task boxes 104, 106, 108, 110, 112; and workbench platforms 114, 116, and 118. Accessories shown include cup holder 120, and tool holder 122, 124. FIG. 2 is an upper rear perspective view of the hand truck of the present invention, while FIGS. 3 and 4 are rear and side views thereof. FIG. 5 is a top view of FIG. 1; FIG. 6 is a rear view in elevation of the apparatus of FIGS. 1 and 5; and FIGS. 7 and 8 are, respectively, front and side views thereof. Collectively, these views show that novel hand truck 102 comprises two vertical side rails 130, 132, terminating at their respective lower ends, in a support platform 134. The rails, preferably extruded aluminum, include at least one, and preferably three accessory attachment slots 136, 138, 140, and 142, 144, and 146, respectively, running substantially the entire length of the rail. The attachment slots are defined by arcuate extensions 150 of each side forming opposing channels (see esp. FIGS. 2 and 4B).

The rear slots, 140 and 144 of the respective rails receive a slidable handle 152, 154, each having compression levers 156, 158, that bear upon the slot surface to lock the handle in place and which may be released to allow a selection of handle locations or complete removal of the handle altogether.

Preferably, outside rail slots include a plurality of embedded electrical outlets 160, all of which are provided with electrical power through a retractable extension cord 162, positioned astride one rail and disposed on a reel (not shown) contained within a housing 163. This extension cord may be connected to a power source (not shown). A retractable auxiliary extension cord 164, also disposed on a reel (not shown), is provided at the outside of the other rail to provide power to tools employed remote from the workstation. Again, the reel is contained within a housing 165.

As is customary with hand trucks, two coaxial wheels 166, 168 are provided on one or more axles 170, and one or more cross braces 172 and rear supports 174, 176 enhance sturdiness and stability.

The interior surfaces of rails 130, 132 are characterized by a plurality of horizontal channels 178 adapted for slidably receiving complementary male elements defining the attachment portion of accessories (such as the drawer rails 180 for the task boxes shown in FIGS. 9-12, and shown attached in FIGS. 1, and 5-8). Further, channels 178 have incorporated within each electrical terminals (not shown) to provide power to any task box using such electrical feature. Additionally, a simplified version of the vertical rails 130, 132 (not shown) which would include channels 178 would be adapted as a mounting system for use inside a truck's utility box, service van, or a work shop environment to provide further flexibility for the storage and use of the task box system in other environs.

Accessories, such as a tool holder 122, 124, cup holder 120, bin tray 368, wire spool holder 362, and work surface platforms 114, 116, and 118, may be attached to the hand truck by sliding attachment lever elements onto the outside slots 136, 138, 140, 142, 144, or 146. A middle work surface having rail clamps 182 may be attached by sliding the board over the front, rear, and interior sides of the rails which can then be clamped firmly to the rails an any height (as depicted by platform 116).

Task boxes may be attached to ball bearing drawer slides 180 (which are, in turn, affixed to channels 178) or directly to the channels. As is well known, the roller bearing drawer slides include side mechanisms, one on each side of the drawer. These slide mechanisms slide into the channels 178 of the task cart or task truck. Interposed between the side slide mechanisms of the drawer is a horizontal support tray, preferably fabricated of sheet metal. To allow the boxes to slide into the vertical rails of the cart or truck, they must be elevated to allow the horizontal finger guides or tangs 208 of the box to align with the channels of the rails.

Middle work platform 116 preferably includes a plurality of dogs 186 for attaching vises 188 and/or other workholding devices.

As will be readily appreciated, virtually any common work bench tool holder or workpiece holding device can be adapted to attach to the hand truck, and trade-specific devices may also be adapted for attachment to and between the side rails.

Figure 9:
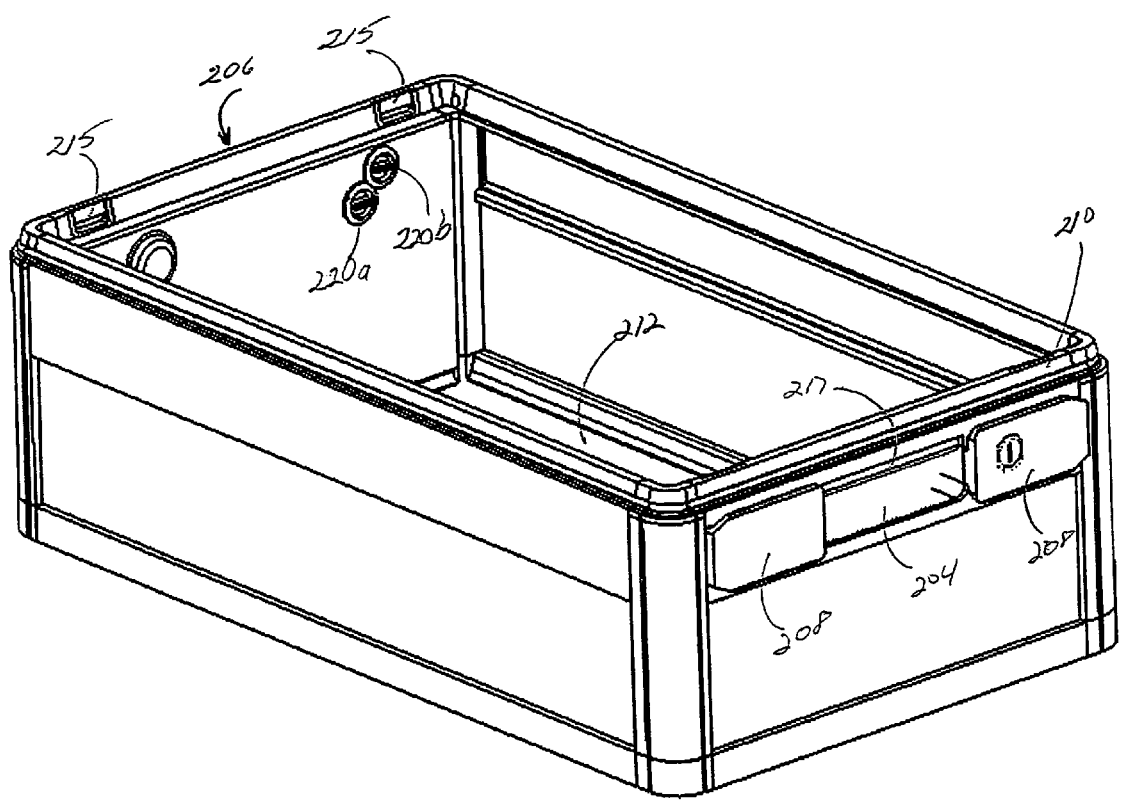
FIG. 9 is a perspective view of a single element of the stackable task box system of the present invention.

FIG. 9 is a perspective view of a single task box 202 comprising one element of the stackable task box system 200 of the present invention, as illustrated in FIGS. 10*a* and 10*b*, which show, respectively, side views in elevation and perspective views of a plurality of stackable task box units of varying sizes in a stacked configuration and as discrete units. FIGS. 9A and 9B are, respectively, a perspective view of the task box shown with side panels and handle covers removed, and a side view in elevation showing detail of the latching system of the task box. These views show that the novel latching system includes handles 207 connected to a latch 209 which is biased away from the task box by a leaf spring 211 interposed between the handle and the latch. The latch has a slot engaging portion 213 which is snap inserted into slots or strikes 215 when a task box is stacked atop another task box. To remove the stacked box, the handle is pulled up, which loads the latch and causes the spring to urge the latch out of the slot, thus releasing the upper box. In a first preferred embodiment, each task box includes four latches, two each on each side of a box, and a trigger handle 217 operatively connected to each set of latches, said trigger handle exposed in handle opening 204 and selectively actuated when the latch lock 218 is unlocked.

FIG. 11 is a side view in elevation of a task box, showing detail of the locking assembly with handle covers installed, and FIG. 12 is a front view in elevation of a task box unit. Collectively, these views show a novel task box system characterized by one or more task boxes adapted for use alone or in connection with either the hand truck described above, or with the task cart, described in detail below. If used with the hand truck or cart, the boxes may be attached via drawer slides which enable the boxes to function as drawers.

Each task box is preferably fabricated from 6061 aluminum or other high performance aluminum alloy, and is therefore highly rigid, sturdy, and abrasion and corrosion resistant. Task boxes may also be fabricated of high impact plastic for a more economical option for containment. The boxes may come in any suitable size and are generally cuboid. They include recessed or fully open handles 204 and 206 at each side, and tangs 208 adapted for slidable mating with slots 178 in either the hand truck or task cart. The upper perimeter edge 210 of each box is beveled, and the floor 212 is recessed so that the boxes 200a-c can be nested (as shown in FIG. 10a). When stacked, the floor of interior boxes in the nested configuration function as the cover for lower boxes. A top 214, 216 may be provided for the assembly if desired. A top 214, 216 may also be used as a base plate such that when it is bolted to the bed of a truck or service vehicle, it acts as a secure platform from which any number of task boxes can be locked. Each box further includes a keyed lock 218 which activates the locking mechanism that allows locking the box to the box immediately below it. The latch may be automatic or manual, according to the preference of the user via two interior latch mechanisms 220a and 220b. Each nested box locks at all four corners to ensure maximum security. In its preferred embodiment it is also whether resistant and may be made water tight with appropriate seals and gaskets interposed between nested boxes.

Figure 13:
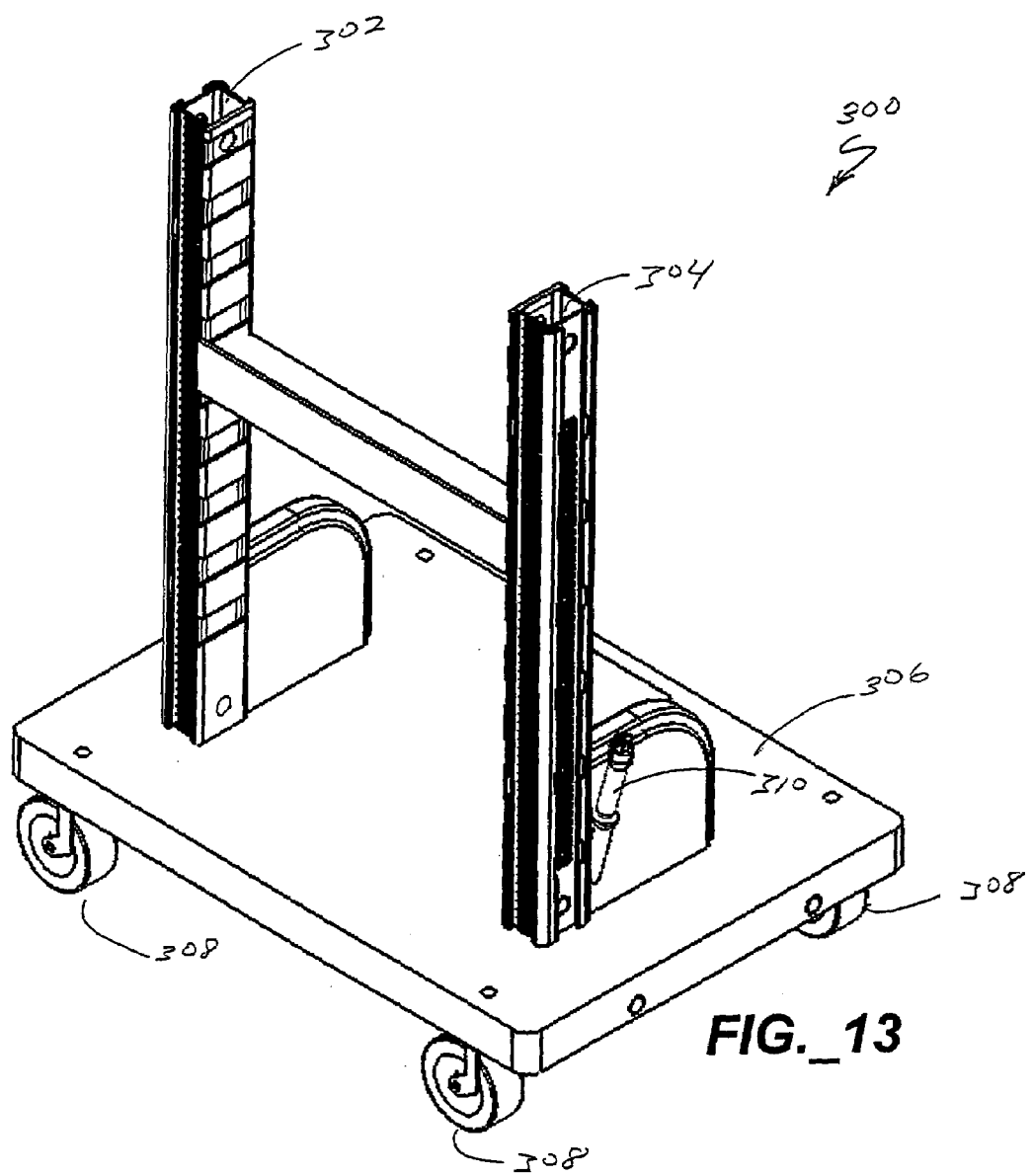
FIG. 13 is an upper perspective view of the task cart component of the present inventive system.
Figure 17B:
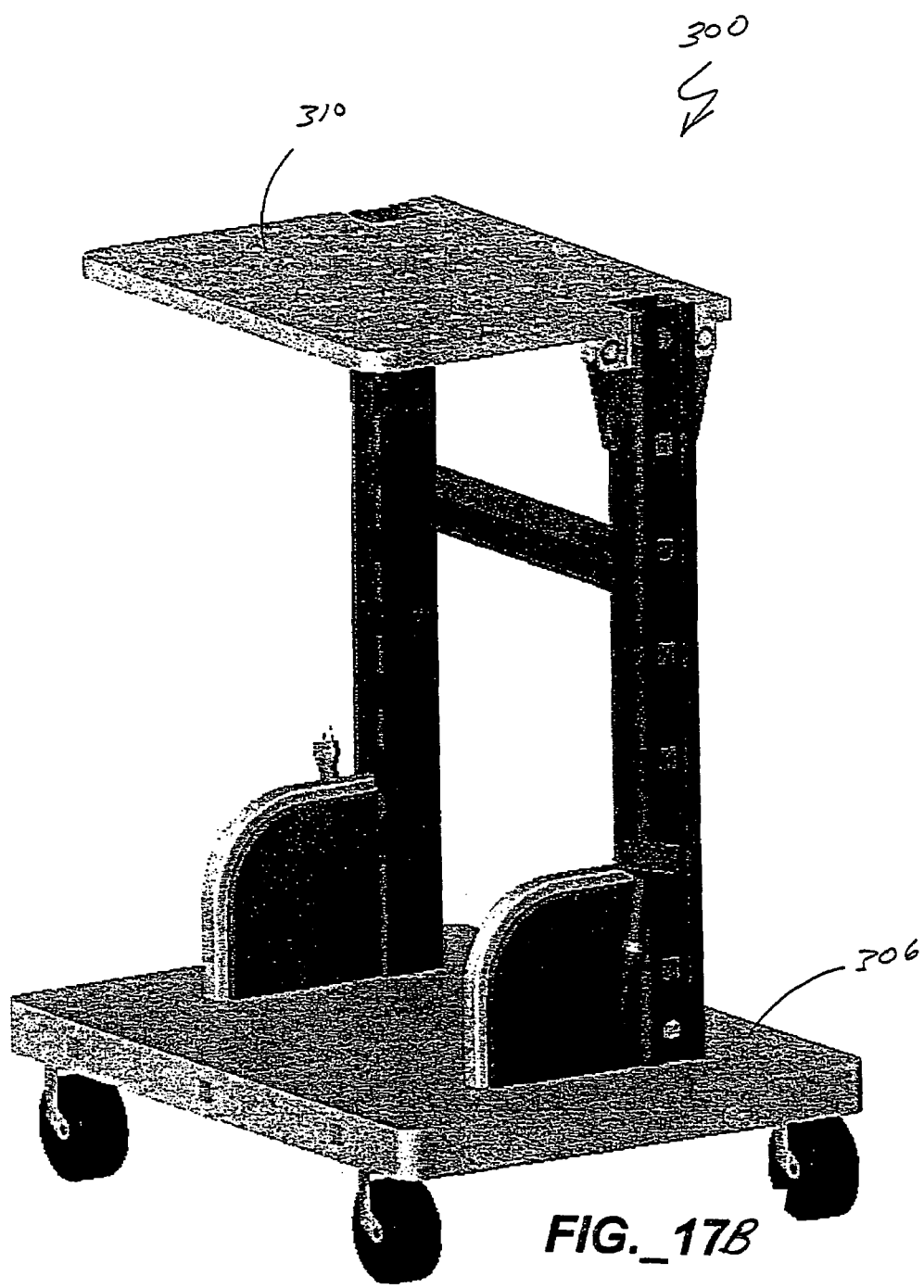
FIG. 17B is a perspective view showing the task cart with a working surface attached to and disposed between the vertical supports.

FIGS. 13-17 are various views of the task cart system of the present invention. FIG. 13 is an upper perspective view of the task cart component 300 of the present inventive system, while FIGS. 14, 15, and 16 are, respectively, top, side, and front views thereof. FIGS. 17A and 17B are, respectively, a perspective view of the task cart showing the side rails and task box removed from the base dolly, and a perspective view showing the task cart having a work surface 310 disposed on and between the side rails. As will be readily appreciated, the task cart may have task boxes, workbenches, accessories and tool holders, and other accessories installed, just as with the hand truck described above.

The task cart 300 comprises a second structural base for a modular tool and task box storage, transport, and workbench system. The task cart, like the hand truck, comprises two rails 302, 304, mounted on a support base 306. Unlike the hand truck, however, the base does not extend from two wheels, but sits atop at least four lockable caster wheels. Otherwise, the system is essentially identical, including retractable extension cords, 310, 312, and outlet arrays 315. Furthermore, the functional principles of attaching accessories are identical to those of the hand truck.

Figure 18:
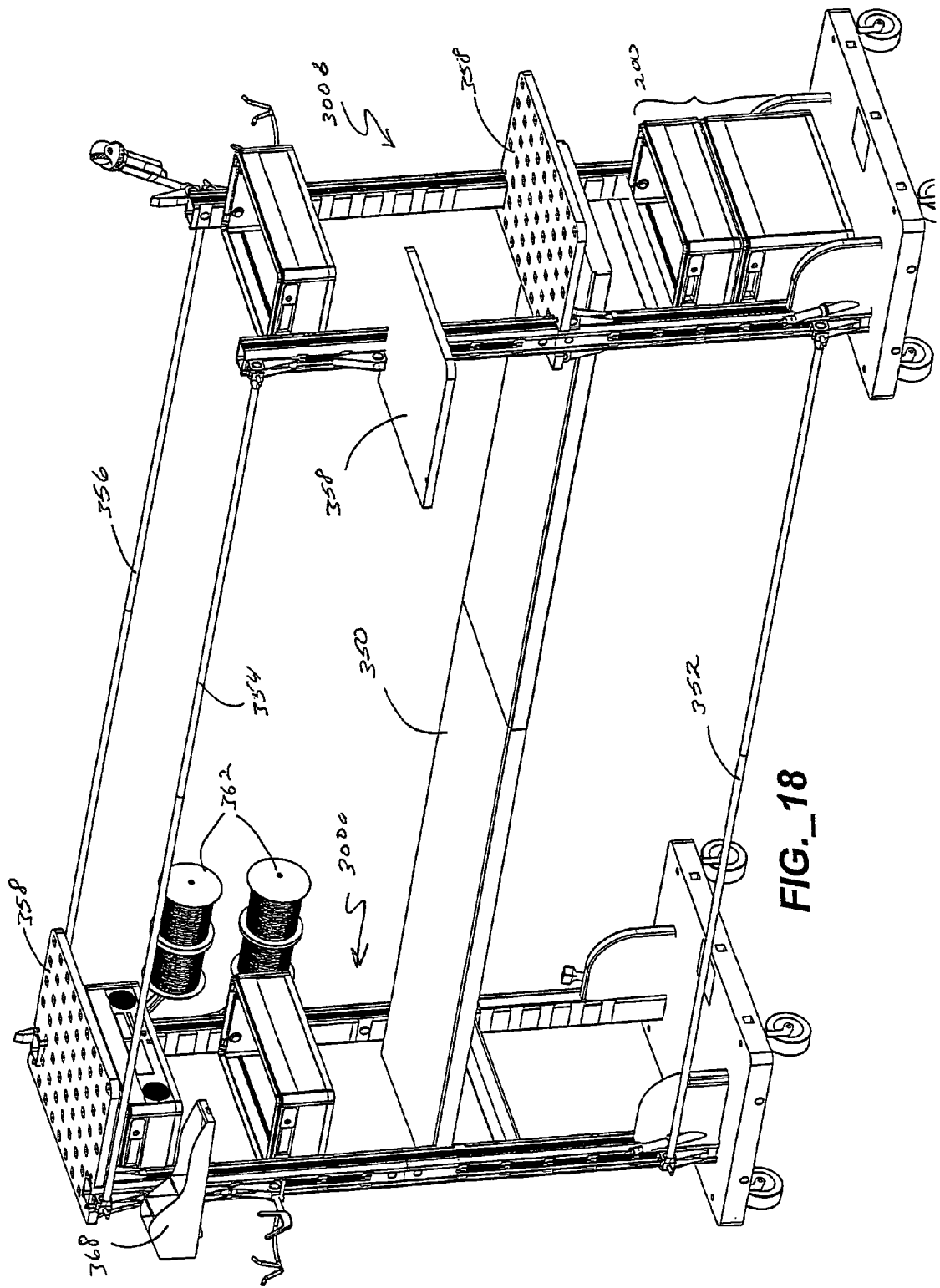
FIG. 18 is a perspective view showing two task carts deployed in cooperation with one another to function as supports for a scaffolding plank/workbench system.

FIG. 18 is a perspective view showing two task carts 300a, 300b deployed in cooperation with one another to function as supports for a scaffolding plank 350 interposed between the two carts. Braces or horizontal side rails 352, 354, 356 can be added for additional stability. Work surfaces and clamping tables 358, lighting 360, wire spools 362, material shoes 368, task boxes, and power, are all readily accessible. From these views it can be appreciated that considerable material and support can be provided to a tradesman, craftsman, or the like, in the field.

Figure 19:
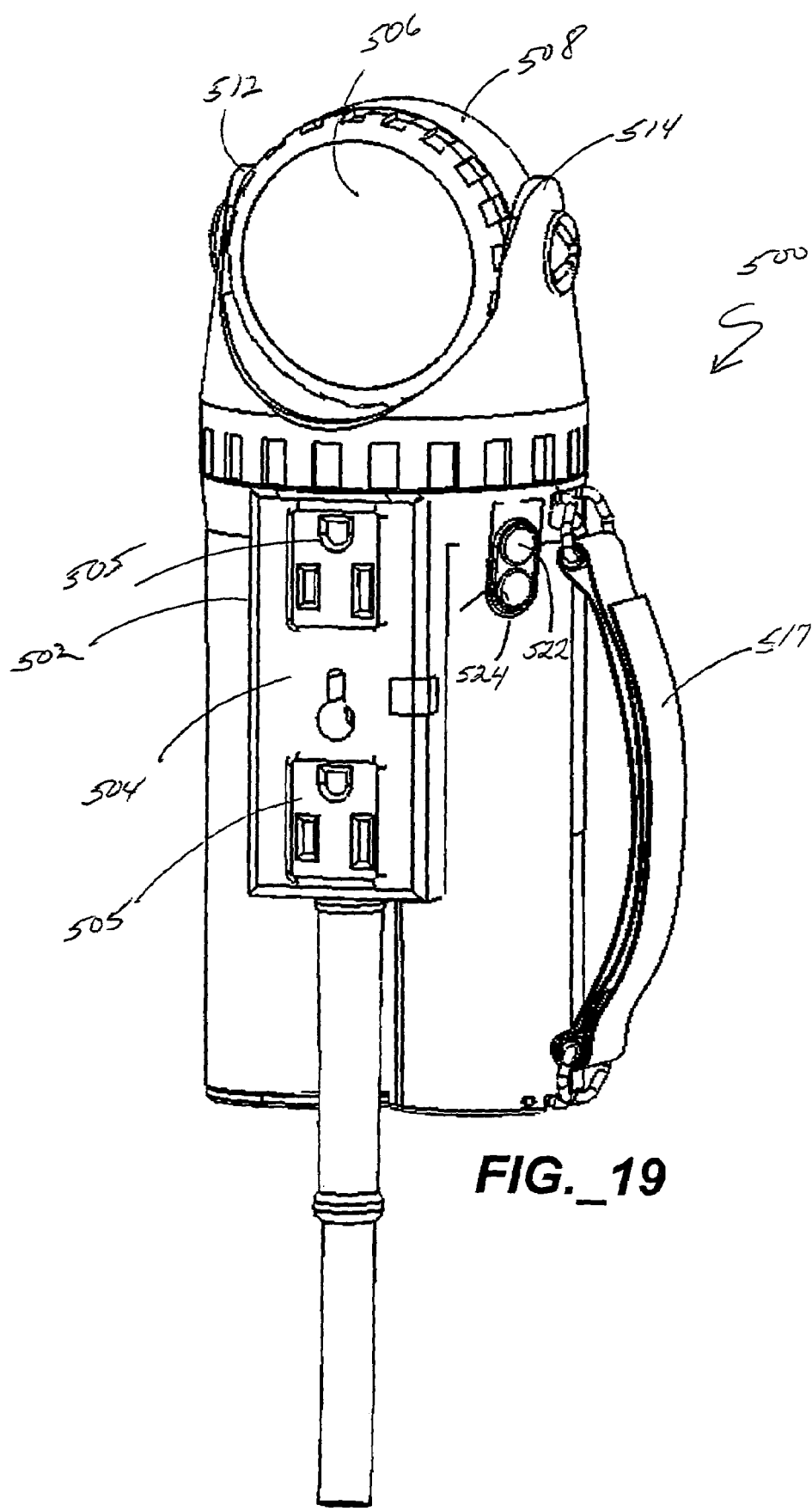
FIG. 19 is a front perspective view of an optional rechargeable task light that forms part of an expanded integrated workbench system.

FIGS. 19-21 are various views of the rechargeable task light 500 adapted for use with the above-described modular tool and task box system. The light has a high impact case 502, preferably plastic, and includes a sealed rechargeable battery charging unit 504 having integral electrical receptacles 505, which may be replaced with 4 D-cell batteries. The lens 506 is generally hemispherical and housed in a sphere 508 that rotates 360 degrees on an axis defined by a pin 510 journaled on two shoulders 512, 514 of the case head 516. An overlapping Velcro handle provides adjustable options for holding or hanging the light, as does clip 518. The task light includes a novel feature that allows the rechargeable battery charging unit to be connected to an electrical extension cord and to simultaneously function as an alternative outlet for other power devices.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A tool and task box storage, transport, and workbench system, comprising:
   a support base having at least two wheels for transport and a top surface;
   at least two side rails vertically disposed from said top surface of said support base; and
   mounting means integral with said side rails for mounting one or more selectively attachable and detachable mounting devices, wherein said mounting means includes at least three accessory vertical attachment slots running substantially the entire length of each of said side rails, including a front, rear and outside attachment slot, and wherein said attachment slots comprise arcuate extensions of a side of said side rail so as to form opposing channels.

2. The apparatus of claim 1, wherein said support base is substantially planar.

3. The apparatus of claim 1, wherein said support base has two wheels and comprises the base of a hand truck.

4. The apparatus of claim 1, wherein said support base has at least four caster wheels and comprises the base of a task cart.

5. The apparatus of claim 1, further including one or more mounting devices having structure for cooperating with said mounting means, said mounting devices selected from the group consisting of tool holders, work bench platforms, electrical devices, lockable nestable tool storage task boxes, cup holder, bin tray, and wire spool holder.

6. The apparatus of claim 1, further including an electrical cord housing and at least one retractable power cord disposed in said electrical cord housing.

7. The apparatus of claim 5, further including an array of electrical receptacles disposed along one or more sides of said side rails, each of said electrical receptacles electrically connected to said retractable power cord such that electrical apparatus can be powered in the immediate proximity of said support base and said side rails.

8. The apparatus of claim 1, further including first and second slidable handles, one each disposed in one of said rear attachment slots.

9. The apparatus of claim 7, wherein said slidable handles include selectively lockable compression levers that permit adjustment of said slidable handles up and down within said rear attachment slot.

10. The apparatus of claim 1, wherein said outside attachment slots include a plurality of embedded electrical outlets.

11. The apparatus of claim 10, wherein said electrical outlets are provided with electrical power through a retractable extension cord positioned proximate one of said side rails and disposed on a reel contained within a housing proximate said support base.

12. The apparatus of claim 1, wherein said side rails have interior surfaces having a plurality of horizontal channels for slidably receiving male elements to which accessories may be attached.

13. The apparatus of claim 8, further including ball bearing drawer slides attached to said horizontal channels on said interior surface of said side rails.

14. The apparatus of claim 9, further including one or more task boxes attached to said ball bearing drawer slides.

* * * * *